United States Patent
Mori

(10) Patent No.: US 10,229,708 B2
(45) Date of Patent: Mar. 12, 2019

(54) MAGNETIC RECORDING MEDIUM, MAGNETIC SIGNAL REPRODUCTION DEVICE AND METHOD OF MANUFACTURING MAGNETIC RECORDING MEDIUM

(71) Applicant: FUJIFILM Corporation, Tokyo (JP)

(72) Inventor: Masahiko Mori, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 28 days.

(21) Appl. No.: 15/278,705

(22) Filed: Sep. 28, 2016

(65) Prior Publication Data
US 2017/0092314 A1 Mar. 30, 2017

(30) Foreign Application Priority Data
Sep. 30, 2015 (JP) ................... 2015-195161

(51) Int. Cl.
G11B 5/70 (2006.01)
G11B 5/708 (2006.01)
(52) U.S. Cl.
CPC ................ *G11B 5/708* (2013.01); *G11B 5/70* (2013.01)
(58) Field of Classification Search
None
See application file for complete search history.

(56) References Cited

U.S. PATENT DOCUMENTS

| | | | |
|---|---|---|---|
| 6,479,131 B1 * | 11/2002 | Ejiri ........................ | G11B 5/738 428/141 |
| 7,041,397 B2 * | 5/2006 | Kato ........................ | G11B 5/70 428/842.3 |
| 8,535,817 B2 | 9/2013 | Imaoka | |
| 2001/0055699 A1 * | 12/2001 | Kato ........................ | G11B 5/714 428/814 |
| 2005/0282040 A1 * | 12/2005 | Oyanagi ................ | G11B 5/7026 428/840 |
| 2009/0027812 A1 * | 1/2009 | Noguchi ............ | G11B 5/00826 360/324.11 |
| 2011/0052908 A1 * | 3/2011 | Imaoka ................... | G11B 5/70 428/336 |
| 2012/0196156 A1 * | 8/2012 | Suzuki ..................... | G11B 5/70 428/844 |
| 2013/0084470 A1 * | 4/2013 | Hattori .................. | G11B 5/7013 428/842.3 |
| 2013/0260179 A1 * | 10/2013 | Kasada ................ | G11B 5/7085 428/840.2 |
| 2014/0287271 A1 * | 9/2014 | Sato ........................ | G11B 5/708 428/843.1 |

FOREIGN PATENT DOCUMENTS

JP 2011-48878 A 3/2011

\* cited by examiner

*Primary Examiner* — Kevin M Bernatz
(74) *Attorney, Agent, or Firm* — Sughrue Mion, PLLC

(57) ABSTRACT

The magnetic recording medium has a magnetic layer containing multiple nonmagnetic particles having a ratio, major axis length/minor axis length, of less than or equal to 1.5, the multiple nonmagnetic particles are present in the magnetic layer in a state where, when the depth to which each of the multiple nonmagnetic particles is embedded in the magnetic layer in observation of a sectional image picked up by SEM is denoted as b and the thickness of the magnetic layer as t, the average value of the ratio of b/t is less than or equal to 0.9, and the number of protrusions 5 nm or greater in height is 800 or greater and the number of protrusions 20 nm or greater in height is 20 or less as measured by AFM per an area 40 μm×40 μm on the magnetic layer side surface of the magnetic recording medium.

10 Claims, No Drawings

MAGNETIC RECORDING MEDIUM, MAGNETIC SIGNAL REPRODUCTION DEVICE AND METHOD OF MANUFACTURING MAGNETIC RECORDING MEDIUM

CROSS-REFERENCE TO RELATED APPLICATIONS

This application claims priority under 35 U.S.C 119 to Japanese Patent Application No. 2015-195161 filed on Sep. 30, 2015. The above application is hereby expressly incorporated by reference, in its entirety.

BACKGROUND OF THE INVENTION

Field of the Invention

The present invention relates to a magnetic recording medium, a magnetic signal reproduction device and a method of manufacturing a magnetic recording medium.

Discussion of the Background

In a particulate magnetic recording medium, a magnetic layer containing ferromagnetic powder and binder is present on a nonmagnetic support and a nonmagnetic layer containing nonmagnetic powder and binder is optionally present between the nonmagnetic support and the magnetic layer.

Conventionally, nonmagnetic powder (nonmagnetic particles) that can contribute to reducing the coefficient of friction during running has been incorporated along with ferromagnetic powder into the magnetic layer of a particulate magnetic recording medium (for example, see Japanese Unexamined Patent Publication (KOKAI) No. 2011-48878 or English language family members US2011/052908A1 and U.S. Pat. No. 8,535,817, which are expressly incorporated herein by reference in their entirety.

SUMMARY OF THE INVENTION

When the coefficient of friction is high in the course of reproducing a signal recorded on a magnetic recording medium while bringing a magnetic head and the surface (on the magnetic layer side) of a magnetic recording medium into (sliding) contact, the increase in noise due to reduced running stability and adhesion to the magnetic head of foreign material generated by shaving of the surface of the magnetic recording medium cause output fluctuation (spacing loss). To inhibit the occurrence of such phenomena, it is desirable to reduce the coefficient of friction. Incorporating the above nonmagnetic particles into the magnetic layer is an effective way of doing this. An increase in the coefficient of friction during running can be inhibited by reducing the contact area (the so-called actual contact area) in the course of bringing the surface of a magnetic recording medium into contact with a magnetic head. These nonmagnetic particles can impart a suitable degree of roughness to the surface of the magnetic recording medium, and are thus thought to contribute to reducing the actual contact area.

Conversely, when the surface of the magnetic recording medium becomes coarse, a drop in output is produced due to an increase in spacing between the magnetic head and the surface of the magnetic recording medium during signal reproduction, and the electromagnetic characteristics (signal-to-noise ratio: SNR) end up dropping. That is, there is a tradeoff between the reduction in the coefficient of friction during running and enhancement of the electromagnetic characteristics. It is not easy to achieve both.

In this regard, Japanese Unexamined Patent Publication (KOKAI) No. 2011-48878 proposes a means of achieving both a reduction in the coefficient of friction (described as an "improvement in the friction characteristic" in Japanese Unexamined Patent Publication (KOKAI) No. 2011-48878) and good electromagnetic characteristics. However, investigation by the present inventor has shown that it is desirable to further improve the magnetic recording medium described in Japanese Unexamined Patent Publication (KOKAI) No. 2011-48878 to further enhance the electromagnetic characteristics while achieving a reduction in the coefficient of friction during running.

An aspect of the present invention provides for a magnetic recording medium that is capable of reducing the coefficient of friction during running while further enhancing electromagnetic characteristics.

An aspect of the present invention relates to:

a magnetic recording medium having a magnetic layer containing ferromagnetic powder and binder on a nonmagnetic support;

wherein the magnetic layer contains multiple nonmagnetic particles having a ratio of the major axis length to the minor axis length (major axis length/minor axis length) of less than or equal to 1.5;

the multiple nonmagnetic particles are present in the magnetic layer in a state where, when the depth to which each of the multiple nonmagnetic particles is embedded in the magnetic layer in observation of a sectional image picked up by a scanning electron microscope is denoted as b and the thickness of the magnetic layer is denoted as t, the average value of the ratio of b/t is less than or equal to 0.9; and the number of protrusions greater than or equal to 5 nm in height is greater than or equal to 800 and the number of protrusions greater than or equal to 20 nm in height is less than or equal to 20 as measured by an atomic force microscope per an area 40 μm×40 μm on the magnetic layer side surface of the magnetic recording medium.

The above magnetic recording medium can make it possible to reduce the coefficient of friction during running, and to obtain better electromagnetic characteristics than those achieved in the magnetic recording medium described in Japanese Unexamined Patent Publication (KOKAI) No. 2011-48878. Although not intended to limit the present invention in any way, the present inventor presumes the following in this regard.

(1) The present inventor presumes that the presence of multiple nonmagnetic particles—which have a ratio of major axis length to minor axis length (major axis length/minor axis length) of less than or equal to 1.5—in the magnetic layer in a state where, when the depth to which each of the multiple nonmagnetic particles is embedded in the magnetic layer is denoted as b and the thickness of the magnetic layer is denoted as t, the average value of the ratio of b/t is less than or equal to 0.9 when observing a sectional image picked up by a scanning electron microscope, can contribute to further enhancing the electromagnetic characteristics. The details are as set forth below.

The present inventor presumes that one factor impeding further improvement in the electromagnetic characteristics in the magnetic recording medium described in Japanese Unexamined Patent Publication (KOKAI) No. 2011-48878 is that the nonmagnetic particles that are incorporated into the magnetic layer to reduce the coefficient of friction during running end up accounting for the entire region in the direction of thickness of the magnetic layer. When the thickness of the magnetic layer is denoted as 1 in the magnetic recording medium described in Japanese Unexamined Patent Publication (KOKAI) No. 2011-48878, these nonmagnetic particles have an average particle diameter of greater than or equal to 1.1 (specifically, greater than or equal to 1.1 but less than or equal to 8.0) (see claim 1 of Japanese Unexamined Patent Publication (KOKAI) No. 2011-48878). Thus, it is thought to be highly possible that they end up occupying the entire region in the direction of thickness. If the nonmagnetic particles were to occupy the entire region in the direction of thickness of the magnetic layer, the ratio b/t of the depth of embedding b to the thickness of the magnetic layer would become 1.0.

By contrast, the average value of the ratio b/t of the depth of embedding b to the thickness of the magnetic layer in the above magnetic recording medium is less than or equal to 0.9. This means that many of the nonmagnetic particles do not account for the entire region of the magnetic layer in the direction of thickness, and that a region is present in which the vicinity of the interface with the nonmagnetic support adjacent to the magnetic layer or with the nonmagnetic layer, described in detail further below, is not accounted for by nonmagnetic particles in the magnetic layer. The present inventor presumes that the presence of nonmagnetic particles in this state can contribute to further enhancing electromagnetic characteristics.

The reason for specifying nonmagnetic particles having a ratio of major axis length to minor axis length (major axis length/minor axis length) of less than or equal to 1.5 as the above nonmagnetic particles is to specify nonmagnetic particles that are capable of contributing to reducing the actual contact area by protruding from the surface of the magnetic recording medium and contributing to a suitable coarseness.

(2) The present inventor presumes that the presence of a number of protrusions greater than or equal to 5 nm in height of greater than or equal to 800 and a number of protrusions greater than or equal to 20 nm in height of less than or equal to 20 as measured by an atomic force microscope per an area 40 μm×40 μm on the magnetic layer side surface of the magnetic recording medium can contribute to reducing the coefficient of friction during running without impeding further improvement in the electromagnetic characteristics. More particularly, the present inventor presumes that reducing the number of protrusions greater than or equal to 20 nm in height that are thought to impede further improvement in the electromagnetic characteristics and ensuring the suitable presence of protrusions greater than or equal to 5 nm in height, which are thought to contribute to reducing the actual contact area in the course of the magnetic head coming into contact with the surface of the magnetic recording medium during running without impeding further improvement in the electromagnetic characteristics, contribute to reducing the coefficient of friction during running.

However, the above is a mere presumption and is not intended to limit the present invention in any way.

In one embodiment, the ratio φ/t of the average major axis length φ of the multiple nonmagnetic particles having a ratio of major axis length to minor axis length (major axis length/minor axis length) of less than or equal to 1.5 that are contained in the magnetic layer to the thickness of the magnetic layer is less than or equal to 1.0.

In one embodiment, the average major axis length φ of the multiple nonmagnetic particles having a ratio of major axis length to minor axis length (major axis length/minor axis length) of less than or equal to 1.5 that are contained in the magnetic layer falls within a range of 10 nm to 100 nm.

In one embodiment, the thickness of the magnetic layer t is less than or equal to 100 nm.

In one embodiment, the multiple nonmagnetic particles having a ratio of major axis length to minor axis length (major axis length/minor axis length) of less than or equal to 1.5 that are contained in the magnetic layer are inorganic oxide particles.

In one embodiment, the inorganic oxide particles are silicon oxide particles.

In one embodiment, the silicon oxide particles are silica colloidal particles.

In one embodiment, the number of protrusions greater than or equal to 5 nm in height as measured by an atomic force microscope per an area of 40 μm×40 μm on the magnetic layer side surface of the magnetic recording medium is greater than or equal to 800 but less than or equal to 500,000.

In one embodiment, the number of protrusions greater than or equal to 5 nm in height as measured by an atomic force microscope per an area of 40 μm×40 μm on the magnetic layer side surface of the magnetic recording medium is greater than or equal to 4,000.

In one embodiment, the number of protrusions greater than or equal to 20 nm in height as measured by an atomic force microscope per an area of 40 μm×40 μm on the magnetic layer side surface of the magnetic recording medium is less than or equal to 10.

In one embodiment, the magnetic recording medium has a nonmagnetic layer containing nonmagnetic powder and binder between the nonmagnetic support and the magnetic layer.

A further aspect of the present invention relates to a magnetic signal reproduction device including the above magnetic recording medium and a magnetic reproduction head.

In one embodiment, the magnetic signal reproduction device reproduces with the magnetic reproduction head a magnetic signal that has been recorded at a linear recording density of greater than or equal to 200 kfci on the above magnetic recording medium.

A further aspect of the present invention relates to a method of manufacturing the above magnetic recording medium, including formation of a magnetic layer, wherein the formation of a magnetic layer includes:

coating and drying a magnetic coating film-forming composition containing ferromagnetic powder and binder, but not containing nonmagnetic particles with a ratio of major axis length to minor axis length (major axis length/minor axis length) of less than or equal to 1.5, on a nonmagnetic support, either directly or over one or more other layers to form a magnetic coating film;

coating and drying an overcoat liquid, containing multiple nonmagnetic particles having a ratio of major axis length to minor axis length (major axis length/minor axis length) of less than or equal to 1.5 and solvent, on the above magnetic coating film to dispose the nonmagnetic particles on the above magnetic coating film; and pressing into the magnetic coating film the nonmagnetic particles that have been disposed to form a magnetic layer that contains ferromagnetic powder and binder and in which the above nonmagnetic particles are present in the above-described state.

In the present invention, the statement that the magnetic coating film-forming composition "does not contain" nonmagnetic particles with a ratio of major axis length to minor axis length (major axis length/minor axis length) of less than or equal to 1.5 means that they are not actively employed as a component in the course of preparing the composition, and that unintentional mixing in is permissible. For example, the mixing in of a quantity of about less than or equal to 0.01 weigh part per 100 weight parts of ferromagnetic powder contained in the above magnetic coating film-forming composition is permissible.

An aspect of the present invention can provide a magnetic recording medium with a low coefficient of friction during running that can further enhance electromagnetic characteristics.

A further aspect of the present invention can provide a magnetic signal reproduction device including the above magnetic recording medium and a method of manufacturing the above magnetic recording medium.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the multiple reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Magnetic Recording Medium

An aspect of the present invention relates to:

a magnetic recording medium having a magnetic layer containing ferromagnetic powder and binder on a nonmagnetic support;

wherein the magnetic layer contains multiple nonmagnetic particles having a ratio of the major axis length to the minor axis length (major axis length/minor axis length) of less than or equal to 1.5;

the multiple nonmagnetic particles are present in the magnetic layer in a state where, when the depth to which each of the multiple nonmagnetic particles is embedded in the magnetic layer in observation of a sectional image picked up by a scanning electron microscope is denoted as b and the thickness of the magnetic layer is denoted as t, the average value of the ratio of b/t is less than or equal to 0.9; and the number of protrusions greater than or equal to 5 nm in height is greater than or equal to 800 and the number of protrusions greater than or equal to 20 nm in height is less than or equal to 20 as measured by an atomic force microscope per an area 40 μm×40 μm on the magnetic layer side surface of the magnetic recording medium.

The above magnetic recording medium will be described in detail below.

In the present invention and present specification, the term "nonmagnetic powder" means an aggregation of multiple nonmagnetic particles. The term "aggregation" is not limited to forms in which the constituent particles are in direct contact, but includes forms in which binder, additives, or the like described below is present between the particles. The term "particles" is also sometimes used to denote powder. These points are also applied to the various powders described in the present invention and present specification, such as ferromagnetic powder.

<Average Value of Ratio b/t>

Multiple nonmagnetic particles with a ratio of major axis length to minor axis length (major axis length/minor axis length) of less than or equal to 1.5 are contained in the above magnetic recording medium. These multiple nonmagnetic particles are present in the magnetic layer in a state where, when the depth of embedding of the individual nonmagnetic particles as observed in a sectional image picked up by a scanning electron microscope (SEM) is denoted as b and the thickness of the magnetic layer is denoted as t, the average value of the ratio b/t is less than or equal to 0.9. The present inventor presumes that having the average value of the ratio b/t be less than or equal to 0.9 can contribute to achieving better electromagnetic characteristics than those achieved in Japanese Unexamined Patent Publication (KOKAI) No. 2011-48878. The presumptions of the present inventor in this regard are as set forth above. From the perspective of achieving even better electromagnetic characteristics, the average value of the ratio b/t is desirably less than or equal to 0.8, preferably less than or equal to 0.7, more preferably less than or equal to 0.6, and still more preferably, less than or equal to 0.5. The average value of the ratio b/t can be, for example, greater than or equal to 0.2 or greater than or equal to 0.3 However, from the perspective of enhancing the electromagnetic characteristics, a low average value of ratio b/t is desirable. It can thus fall below these levels.

(Measurement Methods)

The average value of the ratio b/t set forth above is determined by the following method. An example of measurement in a magnetic recording medium in which a nonmagnetic layer is present on a nonmagnetic support and a magnetic layer is present on the nonmagnetic layer will be given below. However, a magnetic recording medium in which the magnetic layer is directly present on the nonmagnetic support is also possible. In that case, the interface that is described below is the interface of the magnetic layer and nonmagnetic support.

(1) Preparing a Sample for Sectional Observation

A sample for sectional observation is prepared by cutting the sample out at a randomly determined position on the magnetic recording medium for which the average value of ratio b/t is being determined. The sample for sectional observation is prepared by processing with a focused ion beam (FIB) using a gallium ion (Ga$^+$) beam. A specific example of the preparation method will be given in Examples further below.

(2) Specifying the Observation Region

The sample for sectional observation that has been prepared is observed by SEM and a sectional image (SEM image) is picked up. A field emission scanning electron microscope (FE-SEM) is employed as the scanning electron microscope. For example, an FE-SEM S4800 made by Hitachi Ltd. can be employed. An FE-SEM was employed in Examples further below.

In a single sample for sectional observation, a total of four images are obtained by imaging by SEM positions that have been randomly selected in addition to selected points:

(i) such that there is no overlap in the scope of the images picked up;

(ii) such that the magnetic layer side surface (magnetic layer surface) and the nonmagnetic particles protruding on the magnetic layer side surface are included in the SEM image; and (iii) such that the entire region in the direction of thickness of the magnetic layer of the sample for sectional observation (that is, the region from the magnetic layer side surface through the interface of the magnetic layer and the nonmagnetic layer) and the nonmagnetic particles are included in the SEM image when nonmagnetic particles are present that run through the interface of the magnetic layer and the nonmagnetic layer.

The above SEM images are secondary electron (SE) images that are picked up at an acceleration voltage of 5 kV at an imaging magnification of 100,000-fold with 960 vertical pixels by 1,280 horizontal pixels.

In the SEM images, ferromagnetic powder and nonmagnetic powder (nonmagnetic particles) can be readily distinguished by differences in shading on the image, differences in size, differences in shape, and the like. The materials constituting nonmagnetic particles can be analyzed by energy dispersive X-ray spectrometry (EDS), Auger electron spectroscopy (AES), mapping of components on the surface of the magnetic layer by a scanning electron microscope, and other known methods permitting compositional analysis.

(3) Measurement of Thickness of Magnetic Layer t

The SEM image that has been picked up is entered into the image analysis software WinRoof produced by Mitani Corporation and portions (observation regions) of the magnetic layer are selected within the SEM image. In selecting the regions to be observed, the length in the width direction of the observation region is made the full width of the SEM image that has been picked up. The term "width direction" that has been mentioned in relation to the SEM image refers to the width direction of the sample for sectional observation that has been imaged. The term "width direction" in the sample for sectional observation is the direction of width of the magnetic recording medium from which the samples has been cut. The same applies to the thickness direction.

As regards the thickness direction, the interface between the magnetic layer and the nonmagnetic layer is specified by the following method. Image brightness data in the thickness direction (comprised of three components in the form of a coordinate in the thickness direction, a coordinate in the width direction, and the brightness) are prepared by digitizing the SEM image. In digitization, the SEM image is divided into 1,280 parts in the width direction and the brightness is processed with 8 bits to obtain 256-gradation data. The image brightness of each of the coordinate points that have been separated out is converted to a prescribed gradation value. Next, in the image brightness data that have been obtained, the average value of the brightness in the width direction at the various coordinate points in the thickness direction (that is, the average value of the brightness at the 1,280 individual coordinate points that have been divided out) is plotted on the Y-axis, and a brightness curve is plotted with the coordinate in the thickness direction being plotted on the X-axis. The differential of the brightness curve that has been plotted is taken to plot a differential curve. The coordinate of the boundary of the magnetic layer and the nonmagnetic layer is specified from the peak position of the differential curve that has been plotted. The position corresponding to the specified coordinate on the SEM image is adopted as the interface between the magnetic layer and the nonmagnetic layer.

The magnetic layer side surface is also specified with the brightness curve in the same manner as described above.

At one arbitrary point on each of the four images that have been picked up, the shortest distance of a straight line between the specified magnetic layer side surface and the interface between the magnetic layer and the nonmagnetic layer is determined, and the average value of the values determined for four images is adopted as the thickness of the magnetic layer t. In the present invention and present specification, the term "average value" refers to the arithmetic average.

(4) Specifying Nonmagnetic Particles with a Ratio of Major Axis Length to Minor Axis Length (Major Axis Length/Minor Axis Length) of Less than or Equal to 1.5

A portion of the nonmagnetic particles in each of the four images picked up is specified based on the image brightness data, and the major axis length and minor axis length are determined by image analysis. Specifically, each (SEM) image is digitized and image brightness data are produced in the major axis direction and minor axis direction of the nonmagnetic particles (comprised of the three components of a coordinate in the major axis direction, a coordinate in the minor axis direction, and brightness). In the digitization, the SEM image is divided into 1,280 parts in the width direction, the brightness is processed with 8 bits to obtain 256-gradation data, and the image brightness of each coordinate point that has been divided out is converted to a prescribed gradation value. Next, in the image brightness data obtained, the coordinate in the direction corresponding to the major axis of the particle is plotted on the X-axis and the average value of the brightness at each coordinate point in the major axis direction (that is, the average value of the brightness at each coordinate point divided into 1,280) is plotted on the Y-axis to plot a brightness curve. The differential of the brightness curve that has been plotted is taken to plot a differential curve. The coordinate of the boundary of the nonmagnetic particle portion is specified from the peak position of the differential curve that has been plotted. The operation of plotting the coordinate in the direction corresponding to the major axis of the particle on the X-axis is repeated three times, and the longest axis length is adopted as the major axis length. In the minor axis direction as well, the operation of plotting the coordinate on the X-axis is repeated three times, and the shortest axis length is adopted as the minor axis length. More particularly, the axis (straight line) on which the greatest length can be plotted for the length of the particle is determined to be the major axis, and the length of the major axis is adopted as the major axis length. Additionally, the axis of the greatest length when the particle length is plotted on a straight line perpendicular to the major axis is determined to be the minor axis, and the length of this axis is adopted as the minor axis length.

However, nonmagnetic particles of indeterminate shape for which a major axis and/or a minor axis constituting the particle cannot be specified from the shape are excluded from measurement. For nonmagnetic particles for which the ratio of the major axis length and the minor axis length (major axis length/minor axis length) clearly exceeds 1.5 at first glance, it is acceptable not to measure the ratio of the major axis length and the minor axis length (major axis length/minor axis length). At the edge of the image, nonmagnetic particles that are not completely contained within the image will sometimes be observed. Such nonmagnetic particles are excluded from measurement.

As set forth above, all of the nonmagnetic particles having a ratio of the major axis length to the minor axis length (major axis length/minor axis length) of less than or equal to 1.5 are specified in each image.

(5) Calculating the Average Value of Ratio b/t

The position where the distance on a straight line from the interface of the magnetic layer and the nonmagnetic layer is the shortest is specified on the contour of each nonmagnetic particle having a ratio of major axis length to minor axis length (major axis length/minor axis length) of less than or equal to 1.5 as specified in (4) above. The straight line distance between this position and the interface of the magnetic layer and the nonmagnetic layer is adopted as "c". In an image containing these nonmagnetic particles, "c" is subtracted from the value of the thickness t of the magnetic layer obtained in (3), and this value is adopted as the depth of embedding b (that is, "t−c"=b). For a nonmagnetic particle that is fully embedded in the magnetic layer without protruding from the magnetic layer side surface, if the ratio of the major axis length and minor axis length (major axis length/minor axis length) is less than or equal to 1.5, the depth of embedding is calculated by the above method. The value of b that has been calculated is then divided by the thickness t of the magnetic layer that has been calculated in (3) for the image containing the nonmagnetic particle to calculate b/t.

The calculation of b/t is performed for all nonmagnetic particles having a ratio of major axis length to minor axis length (major axis length/minor axis length) of less than or equal to 1.5 that have been specified for the four images that have been picked up. The arithmetic average of the values obtained is adopted as the average value of ratio b/t.

Here, b, c, and t are all values expressed in the same unit. For example, if μm is adopted as the unit, b, c, and t will all be numerical values expressed in μm units. If nm is adopted as the unit, b, c, and t will all be numerical values expressed in nm units. A single unit is also adopted when calculating the ratio of major axis length to minor axis length (major axis length/minor axis length).

<Number of Protrusions>

In the above magnetic recording medium, multiple nonmagnetic particles having a ratio of major axis length to minor axis length (major axis length/minor axis length) of less than or equal to 1.5 in the magnetic layer are present in the magnetic layer in a state where the average value of b/t is less than or equal to 0.9. Further, the number of protrusions measured by atomic force microscope (AFM) on the magnetic layer side surface per an areas of 40 μm×40 μm that are greater than or equal to 5 nm in height is greater than or equal to 800, and the number of protrusions greater than or equal to 20 nm in height is less than or equal to 20. Thus, it becomes possible to reduce the coefficient of friction drops during running and further improve electromagnetic characteristics. In this regard, the presumptions of the present inventor are as set forth above. Unless specifically stated otherwise, the number of protrusions set forth below refers to the number per 40 μm×40 μm area.

The number of protrusions greater than or equal to 5 nm in height per 40 μm×40 μm area is greater than or equal to 800. From the perspective of more effectively inhibiting a rise in the coefficient of friction during running, this number is desirably greater than or equal to 900, preferably greater than or equal to 1,000, more preferably greater than or equal to 2,000, still more preferably greater than or equal to 3,000, yet more preferably greater than or equal to 4,000, and even more preferably, greater than or equal to 5,000. The larger the number of protrusions greater than or equal to 5 nm in height, the more the rise in the coefficient of friction during running can be inhibited. Additionally, the number of protrusions greater than or equal to 5 nm in height per 40 μm×40 μm area can be less than or equal to 500,000, for example. It is also possible to exceed this number.

The number of protrusions greater than or equal to 20 nm in height per 40 μm×40 μm area is less than or equal to 20. From the perspective of further enhancing the electromagnetic characteristics, this number is desirably less than or equal to 15, preferably less than or equal to 10, more preferably less than or equal to 5, still more preferably less than or equal to 3, and even more preferably, 0.

(The Measurement Method)

The numbers of protrusions set forth above are determined by the following method.

A surface where convex components are equal in volume to concave components in the field of view as measured by AFM is determined as a reference surface. Portions greater than or equal to 5 nm in height from the reference surface are deemed to be protrusions of greater than or equal to 5 nm in height and portions greater than or equal to 20 nm in height from the reference surface are deemed to be protrusions greater than or equal to 20 nm in height in measurement regions (area of each measurement region: 40 μm×40 μm) in five spots randomly selected on the magnetic layer side surface of the magnetic recording medium that is to be measured. The number of protrusions in each of the measurement regions is determined. Protrusions that are not fully contained within the measurement region may be present along the edges of the measurement regions, and such protrusions are also counted. The number of protrusions is counted as a cumulative number, so those protrusions that are greater than or equal to 5 nm in height will include the protrusions that are greater than or equal to 20 nm in height. The following measurement conditions are an example of measurement conditions by AFM. The numbers of protrusions given in Examples further below are the average values of the measurement values determined in five spots by measurement based on the following measurement conditions.

Regions 40 μm×40 μm in area that had been randomly selected in five spots on the magnetic layer side surface of a magnetic recording medium were measured by AFM (Nanoscope 4 made by Veeco Corp.). The scan rate (probe displacement rate) was 40 μm/sec, and the resolution was 512 pixels×512 pixels.

<Methods of Adjusting the Average Value of Ratio of b/t and the Number of Protrusions>

Methods of adjusting the various values set forth above will be described next.

The number of protrusions greater than or equal to 5 nm in height and the number of protrusions greater than or equal to 20 nm in height can be desirably adjusted by means of the protrusion state from the magnetic layer side surface of the magnetic recording medium of nonmagnetic particles having a ratio of major axis length to minor axis length (major axis length/minor axis length) of less than or equal to 1.5.

To adjust the average ratio of b/t to less than or equal to 0.9, nonmagnetic particles having a ratio of major axis length to minor axis length (major axis length/minor axis length) of less than or equal to 1.5 are desirably not embedded within the magnetic layer to the degree that they reach the region in the vicinity of the interface between the magnetic layer and the adjacent nonmagnetic support or nonmagnetic layer. In this regard, as described in Japanese Unexamined Patent Publication (KOKAI) No. 2011-48878, so that nonmagnetic particles that are large relative to the thickness of the magnetic layer are not embedded within the magnetic layer, these nonmagnetic particles are made to protrude substantially from the magnetic layer side surface of the magnetic recording medium. However, the protruding nonmagnetic particles are thought to become protrusions greater than or equal to 20 nm in height on the magnetic layer side surface, causing the number of protrusions greater than or equal to 20 nm in height to exceed 20. Additionally, when nonmagnetic particles that are small relative to the thickness of the magnetic layer are simply employed as components of the magnetic layer-forming composition, the nonmagnetic particles are thought to end up being completely embedded in the magnetic layer, making it difficult to achieve a number of protrusions greater than or equal to 5 nm in height of greater than or equal to 800.

Based on the above, the present inventor conducted extensive research. As a result, he conceived that by using nonmagnetic particles that were not as large as the thickness of the magnetic layer described in Japanese Unexamined Patent Publication (KOKAI) No. 2011-48878, and by employing a manufacturing method that localized the nonmagnetic particles on the magnetic layer side surface of the magnetic recording medium to manufacture a magnetic recording medium, it would be possible to obtain a magnetic recording medium in which the ratio of b/t was less than or equal to 0.9, and in which the number of protrusions greater than or equal to 5 nm in height and the number of protrusions greater than or equal to 20 nm in height fell within the ranges set forth above. From this perspective, the ratio $\varphi/t$ of the average value (average major axis length) $\varphi$ of the major axis length of nonmagnetic particles in which the ratio of the major axis length to the minor axis length (major axis length/minor axis length) is less than or equal to 1.5, to the thickness t of the magnetic layer is desirably less than or equal to 1.0, preferably less than or equal to 0.8, and more preferably, less than or equal to 0.6.

In recent years, the recording wavelength has tended to become ever shorter as the recording density has increased. As the recording wavelength has shortened, the bit length, which is the minimum recording unit in magnetic recording, has tended to decrease. At the same time, the impact of the nonmagnetic particles that are contained in the bit volume (bit length×thickness of the magnetic layer) on the electromagnetic characteristics has increased. For this reason, as well, it is desirable for the nonmagnetic particles not to account for the entire region in the direction of thickness of the magnetic layer.

Further, the ratio of $\varphi/t$ can be, for example, greater than or equal to 0.1 or greater than or equal to 0.2, or can fall below these levels. The average value (average major axis length) $\varphi$ of the above major axis length is the arithmetic average of the major axis length of all of the nonmagnetic particles with a ratio of the major axis length to the minor axis length (major axis length/minor axis length) as specified for 4 images picked up by SEM by the method set forth above. The thickness t of the magnetic layer is a value determined by the method set forth above. In calculating $\varphi/t$, the same unit is used for both $\varphi$ and t.

A desirable example of a method for manufacturing the magnetic recording medium will be given further below.

The magnetic layer, nonmagnetic layer and the like of the magnetic recording medium according to an aspect of the present invention will be described in greater detail.

<Magnetic Layer>
(Ferromagnetic Powder)

The various powders that are commonly employed as ferromagnetic powders in the magnetic layer of magnetic recording media can be employed as the ferromagnetic powder. The use of a ferromagnetic powder of small average particle size is desirable from the perspective of increasing the recording density of the magnetic recording medium. For this reason, it is desirable to employ a ferromagnetic powder with an average particle size of less than or equal to 50 nm as the ferromagnetic powder. From the perspective of stability of magnetization, the average particle size of the ferromagnetic powder is desirably greater than or equal to 10 nm.

Ferromagnetic hexagonal ferrite powder is a specific example of desirable ferromagnetic powder. From the perspectives of achieving higher density recording and magnetization stability, the average particle size (for example, average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The average particle size of various powders such as ferromagnetic powder is a value measured with a transmission electron microscope by the following method unless specifically stated otherwise.

Powder is photographed at a magnification of 100,000-fold with a transmission electron microscope, and the photograph is printed on print paper at a total magnification of 500,000-fold to obtain a photograph of the particles constituting the powder. A target particle is selected from the photograph of particles that has been obtained, the contour of the particle is traced with a digitizer, and the size of the (primary) particle is measured. The term "primary particle" refers to an unaggregated, independent particle. The particle size of nonmagnetic particles that are employed for forming a magnetic layer is a value measured by the above method.

The above measurement is conducted on 500 randomly extracted particles. The arithmetic average of the particle size of the 500 particles obtained in this manner is adopted as the average particle size of the powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and present specification, the average particle size of the powder, such as ferromagnetic powder and various kinds of powder, is the average particle size as obtained by the above method unless specifically stated otherwise. The average particle size indicated in Examples further below was obtained using a Model H-9000 transmission electron microscope made by Hitachi and KS-400 image analysis software made by Carl Zeiss. The average major axis length φ of nonmagnetic particles having a ratio of major axis length to minor axis length (major axis length/minor axis length) of less than or equal to 1.5 that are contained in the magnetic layer is a value that is determined in a SEM image by the method set forth above.

The method described in paragraph 0015 of Japanese Unexamined Patent Publication (KOKAI) No. 2011-048878, which is expressly incorporated herein by reference in its entirety, for example, can be employed as the method of collecting sample powder from a magnetic recording medium for particle size measurement.

In the present invention and present specification, unless specifically stated otherwise, the size of the particles constituting powder (particle size) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. Unless specifically stated otherwise, the term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

Unless specifically stated otherwise, when the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

The content (fill rate) of ferromagnetic powder in the magnetic layer desirably falls within a range of 50 to 90 weight %, and preferably falls within a range of 60 to 90 weight %. A high fill rate is desirable from the perspective of increasing the recording density.

(Binder)

The above magnetic recording medium contains binder along with ferromagnetic powder in the magnetic layer. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can be homopolymer or copolymer. These resins can also be employed as binders in the nonmagnetic layer and in the backcoat layer described further below. Reference can be made to paragraphs 0028 to 0031 of Japanese Unexamined Patent Publication (KOKAI) No. 2010-24113, which is expressly incorporated herein by reference in its entirety, with regard to the above binders. At least one curing agent can also be employed together with the resin suitable for use as the binder. The curing agent is a compound having at least one, and desirably two or more, crosslinking functional groups per molecule. A curing agent having two or more isocyanate groups per molecule (polyisocyanate) is suitable. Reference can be made to Japanese Unexamined Patent Publication (KOKAI) No. 2011-216149, paragraphs 0124 and 0125, for details regarding polyisocyanate. The curing agent can be employed, for example, by adding a quantity of 0 to 80.0 weight parts, and from the perspective of increasing the strength of various layers such as a magnetic layer, desirably 50.0 to 80.0 weight parts, per 100.0 weight parts of the binder.

(Nonmagnetic Particles Having a Ratio of Major Axis Length to Minor Axis Length (Major Axis Length/Minor Axis Length) of Less than or Equal to 1.5)

The above magnetic recording medium contains multiple nonmagnetic particles having a ratio of major axis length to minor axis length (major axis length/minor axis length) of less than or equal to 1.5 in the magnetic layer in addition to ferromagnetic powder and binder. These nonmagnetic particles are present in the magnetic layer in a state where the average value of the ratio of b/t is less than or equal to 0.9 and the number of protrusions greater than or equal to 5 nm in height and the number of protrusions greater than or equal to 20 nm in height on the surface on the magnetic layer side fall within the respective ranges set forth above. Thus, the coefficient of friction during running can be reduced and it becomes possible to achieve good electromagnetic characteristics. The ratio of the major axis length to the minor axis length (major axis length/minor axis length) of the nonmagnetic particles is desirably less than or equal to 1.3, preferably less than or equal to 1.1, and can be 1.0. When the ratio of the major axis length to the minor axis length (major axis length/minor axis length) of the nonmagnetic particles is 1.0, the major axis length and minor axis length of the particles are equal, that is, the particle is a sphere.

As set forth above, the average major axis length φ of the nonmagnetic particles relative to the thickness t of the magnetic layer is desirably such that the ratio of φ/t is less than or equal to 1.0. The average major axis length φ desirably falls within a range of 10 nm to 100 nm. However, it suffices for the nonmagnetic particles to be present in the magnetic layer in a state where the average value of the ratio of b/t is less than or equal to 0.9. The average major axis length φ is not limited to within the range set forth above.

From the perspective of further enhancing electromagnetic characteristics, the variation in the particle size (major axis length) of the nonmagnetic particles is desirable low. The degree of variation in the major axis length can be evaluated based on the coefficient of variation (CV value). The CV value (unit: %)=(σ/φ)×100. As above, φ denotes the average major axis length and σ denotes the standard deviation in the major axis length. The CV value of nonmagnetic particles with a ratio of major axis length to minor axis length (major axis length/minor axis length) of less than or equal to 1.5 is, for example, less than 30.0%, desirably equal to or less than 15.0%, and preferably less than or equal to 7.0%. The CV value can be, for example, greater than or equal to 3.0%. Because it is desirable to reduce the variation in particle size of the nonmagnetic particles, it can also be lower than the above value. Colloidal particles are desirable as nonmagnetic particles with a low CV value. In the present invention and present specification, the term "colloidal particles" refers to particles that can be dispersed without settling to prepare a colloidal dispersion when one gram is added per 100 mL of at least one organic solvent containing at least methyl ethyl ketone, cyclohexanone, toluene, or ethyl acetate, or a mixed solvent of two or more of these solvents in any blending ratio. Provided that the nonmagnetic particles that have been employed in the formation of the magnetic layer are available, the fact that the nonmagnetic particles contained in the magnetic layer are colloidal particles can be evaluated by whether the nonmagnetic particles have the properties that correspond to the above definition of colloidal particles. Nonmagnetic particles that have been extracted from the magnetic layer can also be used to evaluate whether they have the properties corresponding to the above definition of colloidal particles. The nonmagnetic particles can be extracted from the magnetic layer by the following method, for example.

1. Scraping off about 1 g of magnetic layer. The scraping can be done with a razor blade, for example.
2. Placing the magnetic layer sample that has been obtained by scraping in a container such as an eggplant-shaped flask and adding 100 mL of tetrahydrofuran to the container. Tetrahydrofuran comes in the form of commercial products to which a stabilizer has been added, and in the form of commercial products without stabilizer. A tetrahydrofuran to which no stabilizer has been added is used. The same applies to the tetrahydrofuran that is employed for washing further below.
3. Mounting a reflux condenser on the container and heating the contents for 90 minutes in a bath at a water temperature of 60° C. Filtering with filter paper the contents of the container after heating, washing several times with tetrahydrofuran the solid component that has remained on the filter paper, and transferring the solid component to a container such as a beaker following washing. 4N (4 mol/L) hydrochloric acid aqueous solution is added to the container and non-dissolved residue is collected by filtration with a filter. A filter with a pore diameter smaller than 0.05 μm is employed. For example, a membrane filter (such as an MF Millipore made by Merck Corp.) that is employed in chromatographic analysis can be employed. Washing the residue that has been removed by filtration with a filter several times with pure water and then drying it.

Dissolving the ferromagnetic powder and organic material (binder and the like) obtained by the above operation and recovering the nonmagnetic particles as a residue.

Nonmagnetic particles can be extracted from the magnetic layer by the above process. When multiple types of nonmagnetic particles are contained in the nonmagnetic particles that are thus extracted, the multiple types of nonmagnetic particles can be separated by differences in density.

For the nonmagnetic particles (so-called protrusion-forming agent) employed as components of the magnetic layer to form protrusions on the magnetic layer side surface of the magnetic recording medium, the average particle size as measured by the method for measuring the average particle size of various powders set forth above and the coefficient of variation CV value that is calculated from the values measured by this method are desirably within the ranges set forth above for various values determined by observation of a sectional image picked up by SEM.

The nonmagnetic particles with a ratio of major axis length to minor axis length (major axis length/minor axis length) of less than or equal to 1.5 can be organic or inorganic particles, with inorganic particles being desirable. Examples of inorganic particles are particles such as metal oxides, metal carbonates, metal sulfates, metal nitrides, metal carbides, and metal sulfates. Specific examples are α-alumina with an α conversion rate of greater than or equal to 90%, β-alumina, γ-alumina, θ-alumina, silicon oxide such as silicon dioxide, silicon carbide, chromium oxide, cerium oxide, α-iron oxide, goethite, corundum, silicon nitride, titanium carbide, titanium dioxide, tin oxide, magnesium oxide, tungsten oxide, zirconium oxide, born nitride, zinc oxide, calcium carbonate, calcium sulfate, barium sulfate, and molybdenum disulfide, as well as composite oxides of two or more of the above.

As inorganic particles, inorganic oxide particles are desirable, and silicon oxide particles are preferred.

As set forth above, one desirable form of the nonmagnetic particles is that of colloidal particles. Colloidal particles in the form of inorganic colloidal particles are desirable from the perspective of availability, with inorganic oxide colloidal particles being preferred. Colloidal particles of the above inorganic oxide are examples of inorganic oxide colloidal particles. Examples of colloidal particles also include composite inorganic oxide colloidal particles such as $SiO_2.Al_2O_3$, $SiO_2.B_2O_3$, $TiO_2.CeO_2$, $SnO_2.Sb_2O_3$, $SiO_2.Al_2O_3.TiO_2$, and $TiO_2.CeO_2.SiO_2$. Examples of desirable inorganic colloidal particles are $SiO_2$, $Al_2O_3$, $TiO_2$, $ZrO_2$, and $Fe_2O_3$. Silica colloidal particles (colloidal silica) are preferred. Since the surfaces of colloidal particles are generally hydrophilic, they are suited to the preparation of colloidal solutions with water as the dispersion medium. For example, since the surface of colloidal silica obtained by common synthesis methods is covered with polarized oxygen atoms ($O^{2-}$), it adsorbs water when placed in water, forming hydroxyl groups and stabilizing. However, in the organic solvents that are commonly employed in magnetic layer-forming compositions, these particles tend not to remain present in colloidal form. By contrast, the definition of the colloidal particles in the present invention and present Specification is particles that disperse without settling and that form colloidal dispersions when added in a quantity of 1 g per 100 mL of the above-described organic solvents. Such colloidal particles can be prepared by known methods, such as by rendering the surface hydrophobic or the like by a surface treatment. Details describing such hydrophobic treatments are described, for example, in Japanese Unexamined Patent Publication (KOKAI) Heisei Nos. 5-269365 and 5-287213, and Japanese Unexamined Patent Publication (KOKAI) No. 2007-63117. The contents of the above publications are expressly incorporated herein by reference in their entirety.

Two manufacturing methods for desirable colloidal particles in the form of silica colloidal particles (colloidal silica) are generally known: the water glass method and the sol-gel method. The water glass method is a method employing a starting material in the form of sodium silicate (so-called water glass). This is ion-exchanged to generate active silicic acid and grow particles. The sol-gel method is a method that employs tetraalkoxysilane as a starting material. As this is hydrolyzed in the presence of a basic catalyst, particles grow. When silica colloidal particles are employed as the above nonmagnetic particles, the silica colloidal particles can be manufactured by either of these manufacturing methods.

In the magnetic layer, the content of the nonmagnetic particles with a ratio of major axis length to minor axis length (major axis length/minor axis length) of less than or equal to 1.5 is desirably 0.1 to 10.0 weight parts, preferably 0.1 to 5.0 weight parts, per 100.0 weight parts of ferromagnetic powder. In the present invention, a single type of a given component can be incorporated, or two or more different structures or materials can be incorporated. The content of a component that is incorporated in two or more types refers to the combined content of the components. Multiple nonmagnetic particles with a ratio of major axis length to minor axis length (major axis length/minor axis length) of less than or equal to 1.5 can be incorporated into the magnetic layer; the number thereof is not specifically limited.

(Additives)

The magnetic layer of the above magnetic recording medium contains the various components set forth above, and can contain one or more optional additives. An abrasive is an example of a desirable additive. Abrasives are components that are capable of imparting the ability to remove deposits (abrasiveness) that adhere to the magnetic head during running. From the perspective of increasing the strength of the magnetic layer by adding an abrasive to the magnetic layer, particles that are anisotropic in shape are desirable as abrasives. In this regard, a nonmagnetic particle with a ratio of major axis length to minor axis length (major axis length/minor axis length) in excess of 1.5 is desirable, and a nonmagnetic particle with a ratio of major axis length to minor axis length (major axis length/minor axis length) in excess of 1.5 but less than or equal to 5.0 is preferred as an abrasive. The ratio of major axis length to minor axis length (major axis length/minor axis length) of an abrasive is determined in a SEM image as set forth above for nonmagnetic particles with a ratio of major axis length to minor axis length (major axis length/minor axis length) of less than or equal to 1.5. The major axis length of the various particles of abrasive, for example, falls within a range of 30 nm to 100 nm, desirably within a range of 50 nm to 100 nm. Examples of abrasives are substances that are commonly employed as abrasives in the magnetic layer, such as particles of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, and diamond. Of these, various particles of alumina such as α-alumina, silicon carbide, and diamond are desirable. The content of abrasive in the magnetic layer desirably falls within a range of 1.0 to 20.0 weight parts, preferably falls within a range of 3.0 to 15.0 weight parts, and more preferably, falls within a range of 4.0 to 10.0 weight parts, per 100.0 weight parts of ferromagnetic powder.

Examples of additives that can be incorporated into the magnetic layer are lubricants, dispersing agents, dispersion adjuvants, fungicides, antistatic agents, and oxidation inhibitors. Commercial products can be suitably selected for use as additives based on the properties desired.

The magnetic layer as set forth above can be disposed on a nonmagnetic support either directly or over a nonmagnetic layer. Details regarding the nonmagnetic layer and nonmagnetic support will be given further below.

<Nonmagnetic Layer>

In the above magnetic recording medium, the magnetic layer can be disposed directly on a nonmagnetic support, or a nonmagnetic layer containing nonmagnetic powder and binder can be present between the nonmagnetic support and the magnetic layer. The nonmagnetic powder that is employed in the nonmagnetic layer can be an organic or an inorganic substance. Carbon black or the like can also be employed. Examples of inorganic substances are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 to 90 weight %, preferably within a range of 60 to 90 weight %.

For other details regarding binder, additives, and the like in the nonmagnetic layer, known techniques relating to nonmagnetic layers can be applied. As a further example, known techniques relating to magnetic layers can be applied with regard to the quantity and type of binders and the quantity and type of additives.

The nonmagnetic layer of the magnetic recording medium in the present invention may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT or a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

<Backcoat Layer>

In the above magnetic recording medium, a backcoat layer containing nonmagnetic powder and binder can be present on the opposite side of the nonmagnetic support from the side on which the magnetic layer is present. Carbon black and/or inorganic powder are desirably incorporated into the backcoat layer. Known techniques relating to the formulas of the magnetic layer and the nonmagnetic layer can be applied to the binder that is contained, and the various additives that can be optionally contained, in the backcoat layer.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Thicknesses of Nonmagnetic Support and Various Layers>

The thickness of the nonmagnetic support and various layers in the above magnetic recording medium are as follows. The thickness of the nonmagnetic support is, for example, 3.00 μm to 80.00 μm, desirably 3.00 μm to 50.00 μm, and preferably 3.00 μm to 10.00 μm.

From the perspective of achieving higher density recording, the thickness of the magnetic layer is desirably less than or equal to 100 nm. The thickness of the magnetic layer can be determined by the method set forth above. The thickness of other layers and the nonmagnetic support can be determined by the same method as the thickness of the magnetic layer, or can be determined by a known film thickness measurement method. It can also be determined as a design thickness by calculation from the manufacturing conditions, such as the coating conditions. The thickness of the magnetic layer preferably falls within a range of from 10 nm to 100 nm, and more preferably, within a range of 20 nm to 90 nm. The magnetic layer can be in the form of at least one layer, or can be divided into two or more layers having different magnetic characteristics. Configurations known for multilayered magnetic layers can be applied.

The thickness of the nonmagnetic layer desirably falls within a range of 0.01 μm to 0.60 μm, preferably within a range of 0.05 μm to 0.20 μm, and more preferably, within a range of 0.10 μm to 0.20 μm.

The thickness of the backcoat layer is desirably less than or equal to 0.90 μm, preferably 0.10 μm to 0.70 μm.

<Manufacturing Method>

(Preparation of Compositions for Forming Various Layers)

The compositions for forming the magnetic layer, optionally provided nonmagnetic layer, and backcoat layer normally contain solvent in addition to the various components set forth above. Examples of solvent are the various organic solvents that are commonly employed to manufacturing particulate magnetic recording media. Specific examples are, in any proportions, ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methyl cyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethyl formamide; and hexane.

The process of preparing the compositions for forming the various layers, such as the magnetic layer, optionally provided nonmagnetic layer and backcoat layer, normally includes at least a kneading step, a dispersion step, and mixing steps provided before and after these steps as needed. Each of these steps can be divided into two or more stages. All of the starting materials in the form of ferromagnetic powder, binder, nonmagnetic particles with a ratio of the major axis length to the minor axis length (major axis length/minor axis length) of less than or equal to 1.5, various additives, solvent and the like that are employed in the present invention can be added at the start, or part way through, any of these steps. An individual starting material can be divided for addition in two or more steps. For example, binder can be divided up and added in the kneading step, dispersing step, and in a mixing step after the dispersing step for viscosity adjustment. To manufacture the above magnetic recording medium, conventionally known manufacturing techniques can be employed. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads or some other form of bead can be employed to disperse the compositions for forming the various layers. High-density dispersion beads in the form of zirconia beads, titania beads, and steel beads are suitable as such dispersion beads. The particle diameter and fill rate of these dispersion beads can be optimized for use. A known disperser can be employed.

(Coating Step)

The magnetic layer can be formed by coating the magnetic layer-forming composition directly on a nonmagnetic support, or sequentially or simultaneously multilayer coating the magnetic layer-forming composition and the nonmagnetic layer-forming composition. The backcoat layer can be formed by coating the backcoat layer-forming composition on the opposite side of the nonmagnetic support from the side on which the magnetic layer is present (or on the side on which a magnetic layer is provided later). For details regarding the coatings to form the various layers, reference can be made to paragraph 0066 of Japanese Unexamined Patent Publication (KOKAI) No. 2010-231843, which is expressly incorporated herein by reference in its entirety.

(Other Steps)

For various other steps in manufacturing the magnetic recording medium, reference can be made to paragraphs 0067 to 0070 of Japanese Unexamined Patent Publication (KOKAI) No. 2010-231843.

An Embodiment of Desirable Manufacturing Method

An example of a desirable manufacturing method is the following manufacturing method that can localize nonmagnetic particles with a ratio of major axis length to minor axis length (major axis length/minor axis length) of less than or equal to 1.5 on the magnetic layer side surface of the magnetic recording medium:

A method of manufacturing the above magnetic recording medium, including formation of a magnetic layer, wherein the formation of a magnetic layer includes:

coating and drying a magnetic coating film-forming composition containing ferromagnetic powder and binder, but not containing nonmagnetic particles with a ratio of major axis length to minor axis length (major axis length/minor axis length) of less than or equal to 1.5, on a nonmagnetic support, either directly or over one or more other layers (such as the nonmagnetic layer) to form a magnetic coating film;

coating and drying an overcoat liquid, containing multiple nonmagnetic particles having a ratio of major axis length to minor axis length (major axis length/minor axis length) of less than or equal to 1.5 and solvent, on the above magnetic coating film to dispose the nonmagnetic particles on the above magnetic coating film; and pressing into the magnetic coating film the nonmagnetic particles that have been disposed to form a magnetic layer that contains ferromagnetic powder and binder and in which the above nonmagnetic particles are present in the above-described state.

The above method of manufacturing the above magnetic recording medium will be described in greater detail below.

The method of manufacturing the above magnetic recording medium can be implemented in the same manner as the conventional method of manufacturing a particulate magnetic recording medium with the exception of conducting the step of forming a magnetic coating film not containing nonmagnetic particles having a ratio of major axis length to minor axis length (major axis length/minor axis length) of less than or equal to 1.5 through the step of pressing in the nonmagnetic particles in the magnetic layer forming process.

The magnetic coating film can be formed in the same manner as when forming a common magnetic layer with the exception that the composition employed to form the coating film does not contain nonmagnetic particles having a ratio of major axis length to minor axis length (major axis length/minor axis length) of less than or equal to 1.5. For example, the above magnetic coating film can be formed by directly coating the composition for forming the coating film, or sequentially or simultaneously multilayer coating it with a nonmagnetic layer-forming composition, on a nonmagnetic support.

The overcoat liquid that is coated over the magnetic coating film that has been formed contains solvent and multiple nonmagnetic particles having a ratio of major axis length to minor axis length (major axis length/minor axis length) of less than or equal to 1.5. The solvent employed can be any of the various organic solvents set forth above. When the nonmagnetic particles are colloidal particles, it is desirable to employ solvent that is capable of stably dispersing colloidal particles. In the present invention and present specification, the term "colloidal particle" refers, as set forth above, to particles that are capable of dispersing without settling to form a colloidal dispersion when 1 g is added per 100 mL of an organic solvent comprised of at least methyl ethyl ketone, cyclohexanone, toluene, or ethyl acetate, or a mixed solvent containing two or more of these solvents in any mixing ratio. Thus, the solvent selected from the above solvents is desirably used to prepare an overcoat liquid containing the colloidal particles. The concentration of the nonmagnetic particles in the overcoat liquid can be, for example, 5 to 50 weight %, but there is no limitation to this range. In addition to the above nonmagnetic particles and solvent, the overcoat liquid can contain a lubricant in any quantity.

The overcoat liquid can be coated and dried in the same manner as (or based on) the usual magnetic layer-forming composition. Thus the nonmagnetic particles can be disposed on the magnetic coating film.

The nonmagnetic particles that have been disposed on the magnetic coating film can be pressed in on the magnetic coating film side to form a magnetic layer that contains ferromagnetic powder and binder in which the nonmagnetic particles are present in a state where the average value of the ratio of b/t is less than or equal to 0.9. A known method can be used to press in the nonmagnetic particles, such as a surface smoothing treatment of the magnetic recording medium by calender processing or the like. The degree of pressing in can be controlled by means of the calender pressure or the like to adjust the average value of the ratio of b/t.

An embodiment of a desirable manufacturing method has been set forth above. However, the magnetic recording medium according to an aspect of the present invention is not limited to being manufactured by the above manufacturing method.

Magnetic Signal Reproduction Device

An aspect of the present invention relates to a magnetic signal reproduction device including the above magnetic recording medium and a magnetic reproduction head.

So long as the magnetic signal reproduction device includes the magnetic recording medium according to an aspect of the present invention, known techniques can be applied without limitation to the remaining matters thereof.

In one desirable embodiment, a magnetic signal that has been recorded at a linear recording density of greater than or equal to 250 kfci on the above magnetic recording medium is reproduced by a magnetic reproduction head in the above magnetic signal reproduction device. The magnetic recording medium according to an aspect of the present invention can be suitably used to record and reproduce a magnetic signal at a linear recording density of greater than or equal to 200 kfci, or greater than or equal to 250 kfci. The linear recording density is, for example, less than or equal to 800 kfci, but may also exceed 800 kfci.

In recording and reproducing magnetic signals, the protrusions that are present on the magnetic layer side surface of the magnetic recording medium increase the spacing between the magnetic head and the surface of the magnetic recording medium during recording and reproduction. In this regard, the output drop Ls due to the increased spacing is known to be related as follows, where d=spacing [nm] between the magnetic head and the surface of the magnetic recording medium and λ=recording wavelength [nm].

$$Ls[dB]=54.6(d/\lambda)$$

As will be understood from the above relation, the shorter the recording wavelength, the more it is possible to inhibit a drop in output by reducing the spacing. Short wavelength recording means the same thing as high-density recording. Thus, the higher the recording density, the more it becomes possible to inhibit a drop in output by reducing the spacing. In this regard, the present inventor presumes that having numerous protrusions greater than or equal to 20 nm in height causes a drop in output due to spacing in the high-density recording region. Additionally, the present inventor presumes that keeping the number of protrusions greater than or equal to 20 nm in height to within the range set forth above and causing protrusions greater than or equal to 5 nm in height to be present in the number set forth above make it possible to both achieve better electromagnetic characteristics and reduce the coefficient of friction during running even in the high-density recording range.

For details regarding the structure and the like of the magnetic signal reproduction device, reference can be made to paragraphs 0072 and 0073 of Japanese Unexamined Patent Publication (KOKAI) No. 2010-231843.

EXAMPLES

The present invention will be described based on Examples below. However, the present invention is not intended to be limited by the embodiments described in Examples. The "parts" and "%" indicated below denote "weight parts" and "weight %" unless specifically indicated otherwise The colloidal particles (colloidal silica) employed in Examples 1 to 5, 7 and Comparative Example 3 set forth below are all commercial silica colloidal particles prepared by the sol-gel method. Table 1 below gives the average particle size (average major axis length) as measured by the method used to measure the average particle size of various powders, the standard deviation, the coefficient of variation in particle size (CV value), and the average acicular ratio. These silica colloidal particles have properties corresponding to the definition of colloidal particles set forth above.

The silica colloidal particles (colloidal silica) employed in Comparative Examples 1 and 4 are commercial silica colloidal particles prepared by the water glass method. Table 1 below gives the average particle size (average major axis length) as measured by the method used to measure the average particle size of various powders, the standard deviation, the coefficient of variation in particle size (CV value), and the average acicular ratio. These silica colloidal particles have properties corresponding to the definition of colloidal particles set forth above.

The silicon oxide particles employed in Example 6 and Comparative Example 5 are silicon oxide particles (powdered silica) that do not correspond to the definition of colloidal particles set forth above. Table 1 below gives the average particle size (average major axis length) as measured by the method used to measure the average particle size of various powders, the standard deviation, the coefficient of variation in particle size (CV value), and the average acicular ratio.

The carbon black employed in Comparative Example 2 is commercial carbon black that does not correspond to the definition of colloidal particles set forth above. Table 1 below gives the average particle size (average major axis length) as measured by the method used to measure the average particle size of various powders, the standard deviation, the coefficient of variation in particle size (CV value), and the average acicular ratio.

TABLE 1

| Nonmagnetic particles Contained in the magnetic layer | Average particle size (Average major axis length) [nm] | Standard deviation | coefficient of variation (CV value) [%] | Average acicular ratio |
|---|---|---|---|---|
| Colloidal silica A (employed in Examples 1 to 3, 7 and Comp. Ex. 3) | 45 | 5.6 | 12.4 | 1.1 |
| Colloidal silica B (employed in Examples 4, 5) | 25 | 3.8 | 15.2 | 1.4 |
| Colloidal silica C (employed in Comp. Ex. 1) | 200 | 11.0 | 5.5 | 1.1 |
| Colloidal silica D (employed in Comp. Ex. 4) | 110 | 14.0 | 12.7 | 1.1 |
| Silicon oxide particles a (employed in Example 6) | 50 | 5.6 | 11.2 | 1.5 |
| Silicon oxide particles b (employed in Comp. Ex. 5) | 50 | 18.0 | 36.0 | 1.8 |
| Carbon black (employed in Comp. Ex. 2) | 45 | 60.0 | 133.3 | 1.9 |

Example 1

(1) Formula of Magnetic Coating Film-Forming Composition

| (Magnetic liquid) | |
|---|---|
| Ferromagnetic hexagonal barium ferrite powder: (Coercive force Hc: 175 kA/m (2,200 Oe), average particle size (average plate diameter): 20 nm) | 100.0 parts |
| Oleic acid: | 2.0 parts |
| Vinyl chloride copolymer (MR-104 made by Zeon Corp.): | 10.0 parts |
| Sulfonic acid group-containing polyester polyurethane resin (UR-4800 made by Toyobo): | 4.0 parts |
| Methyl ethyl ketone: | 150.0 parts |
| Cyclohexanone: | 150.0 parts |
| (Abrasive liquid) | |
| Diamond particles (average particle size: 50 nm, average acicular ratio: 4.0): | 6.0 parts |
| Sulfonic acid group-containing polyester polyurethane resin (UR-4800 made by Toyobo): | 0.6 part |
| Cyclohexanone: | 23.0 parts |
| (Lubricant and curing agent solution) | |
| Stearic acid: | 2.0 parts |
| Amide stearate: | 0.3 part |
| Butyl stearate: | 6.0 parts |
| Methyl ethyl ketone: | 110.0 parts |
| Cyclohexanone: | 110.0 parts |
| Polyisocyanate (Coronate L made by Nippon Polyurethane Industry Co., Ltd.): | 3.0 parts |

(2) Formula of Nonmagnetic Layer-Forming Composition

| | |
|---|---|
| Red iron oxide (average particle size: 0.15 μm, average acicular ratio: 7, Brunauer-Emmett-Teller (BET) specific surface area: 52 m$^2$/g): | 75.0 parts |
| Carbon black (average particle size: 16 nm, dibutyl phthalate (DBP) oil absorption capacity: 74 cm$^3$/100 g): | 25.0 parts |
| Phenylphosphonic acid: | 3.0 parts |
| Vinyl chloride copolymer (MR-104 from Zeon Corp.): | 12.0 parts |
| Sulfonic acid group-containing polyester polyurethane resin (UR-8401) made by Toyobo: | 8.0 parts |
| Methyl ethyl ketone: | 370.0 parts |
| Cyclohexanone: | 370.0 parts |
| Stearic acid: | 1.0 parts |
| Amide stearate: | 0.3 part |
| Butyl stearate: | 2.0 parts |
| Polyisocyanate (Coronate L made by Nippon Polyurethane Industry Co., Ltd.): | 5.0 parts |

(3) Formula of Backcoat Layer-Forming Composition

| | |
|---|---|
| Carbon black (average particle size: 40 nm, DBP oil absorption capacity: 74 cm$^3$/100 g): | 100.0 parts |
| Copper phthalocyanine: | 3.0 parts |
| Nitrocellulose: | 25.0 parts |
| Sulfonic acid group-containing polyester polyurethane resin (UR-8401) made by Toyobo: | 60.0 parts |
| Polyester resin (Vylon 500 made by Toyobo): | 4.0 parts |
| Alumina powder (α-alumina with BET specific surface area of 17 m$^2$/g): | 1.0 part |
| Polyisocyanate (Coronate L made by Nippon Polyurethane Industry Co., Ltd.): | 15.0 parts |
| Methyl ethyl ketone: | 600.0 parts |
| Toluene: | 600.0 parts |

(4) Preparation of Various Layer-Forming Compositions

The magnetic coating film-forming composition was prepared by the following method.

After the above magnetic liquid was kneaded and diluted in an open kneader, zirconia (ZrO$_2$) beads 0.1 mm in diameter (referred to as "Zr beads" hereinafter) were employed to conduct 30 passes of dispersion processing, each pass including a retention time of 2 minutes, at a bead fill rate of 80 volume % and a rotor tip peripheral speed of 10 m/s in a horizontal bead mill disperser.

The abrasive liquid was prepared by charging the above components, along with Zr beads 0.3 mm in diameter, to a horizontal bead mill disperser and adjusting them so that the (bead volume/(abrasive liquid volume+bead volume))×100 was 80%; conducting bead mill dispersion processing for 120 minutes; removing the liquid following processing; and employing a flow-type ultrasonic dispersion filtration device to conduct ultrasonic dispersion filtration processing.

The magnetic liquid, abrasive liquid, and lubricant and curing agent solution were charged to a dissolver-stirrer and stirred for 30 minutes at a peripheral speed of 10 m/s. The mixture was then processed for 3 passes at a flow rate of 7.5 kg/min in a flow-type ultrasonic dispersion filtration device and filtered through a filter having an average pore diameter of 1 μm to prepare a magnetic coating film-forming composition.

The nonmagnetic layer-forming coating composition was prepared by the following method.

With the exception of the lubricants (stearic acid, amide stearate, and butyl stearate) and the polyisocyanate, the above components were kneaded and diluted in an open kneader. Subsequently, dispersion processing was conducted in a horizontal bead mill disperser. The lubricants and polyisocyanate were then added, and a dissolver-stirrer was used to stir and mix the mixture to prepare a nonmagnetic layer-forming composition.

The backcoat layer-forming composition was prepared by the following method.

With the exception of the polyisocyanate, the above components were charged to a dissolver-stirrer and stirred for 30 minutes at a peripheral speed of 10 m/s. The mixture was then subjected to a dispersion treatment in a horizontal bead mill disperser. Subsequently, the polyisocyanate was added and the mixture was stirred and mixed in a dissolver-stirrer to prepare a backcoat layer-forming composition.

(5) Preparation of Magnetic Tape
(Forming the Nonmagnetic Layer, Back Coat Layer, and Magnetic Coating Film)

The nonmagnetic layer-forming composition was coated and dried to a dry thickness of 0.10 μm on a polyethylene naphthalate support 6.00 μm in thickness. The backcoat layer-forming composition was then coated and dried to a dry thickness of 0.50 μm on the surface on the opposite side of the support from that on which the nonmagnetic layer had been formed. The support on which the nonmagnetic layer and backcoat layer had been formed was rolled up and heat treated for 36 hours in an environment with an atmospheric temperature of 70° C. Following the heat treatment, the magnetic coating film-forming composition was coated and dried on the nonmagnetic layer to form a magnetic coating film.

Subsequently, a surface smoothing treatment (calendering treatment) was conducted at a calender roll surface temperature of 100° C., a linear pressure of 300 kg/cm (294 kN/m), and a rate of 40 m/min with calender rolls comprised solely of metal rolls.

(Preparation of Overcoat Liquid)

An overcoat liquid was prepared by dispersing 20.0 parts of silica colloidal particles (colloidal silica A) in 80.0 parts of methyl ethyl ketone.

(Forming the Magnetic Layer)

The coating quantity of the overcoat liquid that had been formed was adjusted so that the quantity of silica colloidal particles per 100.0 parts of ferromagnetic hexagonal barium ferrite powder contained in the magnetic coating film was the quantity indicated in Table 2 below and then coated and dried on the magnetic coating film to dispose silica colloidal particles on the magnetic coating film.

Subsequently, a calendering treatment was conducted at a calender roll surface temperature of 100° C., a linear pressure of 300 kg/cm (294 kN/m), and a speed of 40 m/min with calender rolls comprised solely of metal rolls to press in the silica colloidal particles that had been disposed on the magnetic coating film and form a magnetic layer.

Subsequently, a heat treatment was conducted for 36 hours in an environment of an atmospheric temperature of 70° C. Following the heat treatment, the product was slit to ½ inch (0.0127 meter) width. Following slitting, a tape cleaning device on which were mounted a sapphire blade and nonwoven cloth pressing against the surface of the magnetic layer was used to clean the surface of the magnetic layer and obtain a magnetic recording medium (magnetic tape).

Examples 2 to 7 and Comparative Examples 2 and 5

With the exception that the quantities of the various nonmagnetic particles per 100.0 parts of the ferromagnetic hexagonal barium ferrite powder contained in the magnetic coating film indicated in Table 1 were adjusted to the quantities given in Table 2 below and coated and dried, magnetic recording media (magnetic tapes) were obtained by the same method as in Example 1. To thicken the magnetic coating film that was formed in Example 7, the quantity of the magnetic coating film-forming composition that was coated was increased relative to Example 1.

Comparative Examples 1, 3, 4

With the exception that, to the magnetic liquid, the various nonmagnetic particles indicated in Table 1 were added to achieve the quantities given in Table 2 below per 100.0 parts of the ferromagnetic hexagonal barium ferrite powder contained in the magnetic liquid, and that the steps from coating of the overcoat liquid to the calendering treatment were not implemented, magnetic recording media (magnetic tapes) were obtained by the same method as in Example 1.

[Evaluation Methods]
1. Average Value of Ratio of b/t

SEM images of the magnetic tapes of Examples and Comparative Examples were picked up by the method set forth above and the magnetic layer thickness t was determined by the method set forth above. In the SEM image that was picked up, all of the nonmagnetic particles with a ratio of major axis length to minor axis length (major axis length/minor axis length) of less than or equal to 1.5 were specified and the ratio of b/t was determined by the method set forth above.

In Comparative Examples 2 and 5, no nonmagnetic particles with a ratio of major axis length to minor axis length (major axis length/minor axis length) of less than or equal to 1.5 were observed. Instead, the ratio of b/t was determined by the method set forth above for carbon black specified in the SEM image that was picked up in Comparative Example 2, and for silicon oxide particles specified in the SEM image that was picked up in Comparative Example 5.

In the above Examples and Comparative Examples, nonmagnetic particles in the form of diamond particles that were contained in the magnetic layer along with the nonmagnetic particles specified above had an average acicular ratio of 4.0 as set forth above. The shape differed greatly from that of the nonmagnetic particles specified above. Accordingly, in the SEM image, the diamond particles were readily distinguishable from the nonmagnetic particles specified above. However, it was also possible to specify the various particles by the known methods of compositional analysis set forth above.

In the magnetic tapes of Examples and Comparative Examples, when the ratio of diamond particles (major axis length/minor axis length) in the magnetic layer was determined by the method set forth above, the ratio (major axis length/minor axis length) of all of the diamond particles contained in the magnetic layer, at about 4.0, greatly exceeded 1.5.

Samples for sectional observation were prepared by the following method.
(i) Samples measuring 10 mm in the width direction of the magnetic tape×10 mm in the thickness direction were cut out with a razor.

A protective film was formed on the surface of the magnetic layer of the samples that were cut out to obtain samples with protective films. The protective films were formed by the following method.

A platinum (Pt) film (30 nm thick) was formed by sputtering on the surface of the magnetic layer of the sample. The platinum film sputtering was conducted under the following conditions.
<Platinum Film Sputtering Conditions>
Target: Pt
Degree of vacuum within chamber of sputtering device: less than or equal to 7 Pa
Current: 15 mA A carbon film was further formed to a thickness of 100 nm to 150 nm on the samples equipped with platinum films that were prepared above. The carbon film was formed by a chemical vapor deposition (CVD) mechanism with a gallium ion ($Ga^+$) beam installed on the focused ion beam (FIB) employed in (ii) below.
(ii) The samples with protective films prepared in (i) above were FIB processed with a gallium ion ($Ga^+$) beam using an FIB device to expose the cross-section of the magnetic tape. The acceleration voltage in the FIB processing was 30 kV and the probe current was 1,300 pA.

The samples for sectional observation that had been thus exposed were observed by SEM to determine the average value of the ratio of b/t.

2. Average Major Axis Length φ, φ/t

The arithmetic average (average major axis length) φ of the major axis length of the nonmagnetic particles with a ratio of major axis length to minor axis length (major axis length/minor axis length) of less than or equal to 1.5 that were specified in 1, above, was calculated, and the ratio with the thickness of the magnetic layer determined in 1, above, φ/t, was determined for Examples 1 to 7 and Comparative Examples 1, 3, and 4.

The arithmetic average (average major axis length) φ of the major axis length was calculated and the ratio with the thickness of the magnetic layer determined in 1, above, φ/t, was determined for the carbon black specified in 1, above, for Comparative Example 2 and for the silicon oxide particles specified in 1, above, for Comparative Example 5.

When the coefficient of variation (CV value) was calculated from the average major axis length φ obtained and the standard deviation σ of the major axis length, values identical to the CV values indicated in Table 1 were obtained for the various nonmagnetic particles employed in Examples and Comparative Examples.

3. Number of Protrusions Measured by AFM on the Magnetic Layer Side Surface of the Magnetic Tape The number of protrusions greater than or equal to 5 nm in height and the number of protrusions greater than or equal to 20 nm in height were determined by the method set forth above for the magnetic tapes of Examples and Comparative Examples.

4. Evaluation of Electromagnetic Characteristics

The SNR was measured for each magnetic tape of Examples and Comparative Examples with a ½ inch (0.0127 meter) reel tester on which had been secured a magnetic head. The relative speed of the magnetic head/magnetic tape was 5.5 m/sec. A metal-in-gap (MIG) head (gap length: 0.15 µm, track width: 1.0 µm) was employed for recording. The recording current was set to the optimal recording current of each magnetic tape. The reproduction head employed was a giant magnetoresistive (GMR) head with an element thickness of 15 nm, a shield spacing of 0.1 µm, and a read width of 0.5 µm. A signal was recorded at a linear recording density of 540 kfci. The reproduced signal was measured with a spectrum analyzer made by Shibasoku. The ratio of the carrier output to the integrated noise of the full spectrum bandwidth was adopted as the SNR. Based on the SNR obtained, the electromagnetic characteristics were evaluated on the scale below. An evaluation result of A indicates a determination that a higher level of improvement was achieved in the electromagnetic characteristics.
Adopting the SNR of Comparative Example 1 as 0.0 dB:
SNR in excess of +0.5 dB: A
SNR greater than or equal to −0.5 dB but less than or equal to +0.5 dB: B
SNR less than −0.5 dB: C 5. Measurement of Coefficient of Friction Each of the tapes of Examples and Comparative Examples was wound on a round rod made of AlTiC (alumina titanium carbide) with a centerline average surface roughness Ra as measured for a 40 µm square (40 µm×40 µm) by AFM of 15 nm and a diameter of 4 mm such that the width direction of the magnetic tape was parallel to the axial direction of the round rod. A 100 g weight was hung from one end of the magnetic tape and the other end was slid 45 mm per pass at a speed of 14 mm/sec while mounted on a load cell. The sliding was repeated for a total of 100 passes. The load during sliding at identical speed was detected by the load cell at pass 1 and pass 100 and measurement values were obtained. The coefficient of friction was calculated based on the following equation:

An evaluation result of A or B resulted in a determination that a decrease in the coefficient of friction during running had been achieved.

The results of the above are given in Table 2.

TABLE 2

| | Thickness of the magnetic layer t[nm] | Nonmagnetic particles indicated in Table 1 and conotained in the magnetic layer | | | | |
|---|---|---|---|---|---|---|
| | | Type | Method for adding to the magnetic layer | Content [weight parts] | Average major axis length φ [nm] | Average major axis length/ Thickness of the magnetic layer φ/t |
| Ex. 1 | 50 | Colloidal silica A | Overcoat (OC) | 1.7 | 45 | 0.9 |
| Ex. 2 | 50 | Colloidal silica A | OC | 3.5 | 45 | 0.9 |
| Ex. 3 | 50 | Colloidal silica A | OC | 0.5 | 45 | 0.9 |
| Ex. 4 | 50 | Colloidal silica B | OC | 0.2 | 25 | 0.5 |
| Ex. 5 | 50 | Colloidal silica B | OC | 0.6 | 25 | 0.5 |
| Ex. 6 | 50 | Silicon oxide particles a | OC | 1.7 | 50 | 1.0 |
| Ex. 7 | 100 | Colloidal silica A | OC | 1.7 | 45 | 0.5 |
| Comp. Ex. 1 | 50 | Colloidal silica C | Mixed in the magnetic liquid | 3.5 | 200 | 4.0 |
| Comp. Ex. 2 | 50 | Carbon black | OC | 1.7 | 45 | 0.9 |
| Comp. Ex. 3 | 50 | Colloidal silica A | Mixed in the magnetic liquid | 1.7 | 45 | 0.9 |
| Comp. Ex. 4 | 50 | Colloidal silica D | Mixed in the magnetic liquid | 1.7 | 110 | 2.2 |
| Comp. Ex. 5 | 50 | Silicon oxide particles b | OC | 1.7 | 50 | 1.0 |

| | Nonmagnetic particles indicated in Table 1 and conotained in the magnetic layer Average value of the ratio b/t | Number of protrusions | | Evaluation results | | |
|---|---|---|---|---|---|---|
| | | greater than or equal to 5 nm in height [per an area 40 μm × 40 μm] | greater than or equal to 20 nm in height [per an area 40 μm × 40 μm] | Coefficients of friction | | SNR [dB] |
| | | | | Pass 1 | Pass 100 | |
| Ex. 1 | 0.8 | 3200 | 3 | B: 0.35 | B: 0.39 | A: 1.5 |
| Ex. 2 | 0.8 | 9500 | 2 | A: 0.25 | A: 0.25 | A: +1.5 |
| Ex. 3 | 0.8 | 850 | 0 | B: 0.39 | B: 0.39 | A: +2.2 |
| Ex. 4 | 0.4 | 3140 | 0 | B: 0.37 | B: 0.39 | A: +1.8 |
| Ex. 5 | 0.4 | 9500 | 0 | A: 0.25 | A: 0.25 | A: +1.8 |
| Ex. 6 | 0.9 | 3150 | 3 | B: 0.35 | B: 0.39 | A: +1.5 |
| Ex. 7 | 0.4 | 3230 | 3 | B: 0.38 | B: 0.39 | A: +1.2 |
| Comp. Ex. 1 | 1.0 | 1956 | 36 | A: 0.28 | A: 0.20 | 0 |
| Comp. Ex. 2 | 0.8 | 5689 | 50 | A: 0.22 | A: 0.25 | C: −1.5 |
| Comp. Ex. 3 | 0.9 | 760 | 0 | D: sticking | Measurement was impossible. | Measurement was impossible. |
| Comp. Ex. 4 | 1.0 | 3100 | 25 | A: 0.25 | A: 0.20 | B: +0.2 |
| Comp. Ex. 5 | 0.9 | 2950 | 30 | A: 0.25 | A: 0.20 | B: 0 |

Coefficient of friction=ln(measured value(g)/100 (g))/π

The coefficients of friction at pass 1 and pass 100 were evaluated on the following scale:

Less than 0.30: A

Greater than or equal to 0.30 but less than 0.40: B

Greater than or equal to 0.40 but less than 0.50: C

Greater than or equal to 0.50 or occurrence of sticking precluding measurement: D Based on the results in Table 2, the magnetic tapes of Examples were found to afford a low coefficient of friction during running and good electromagnetic characteristics.

An aspect of the present invention can be useful in the technical field of magnetic recording media for high-density recording, such as backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium,
   which comprises a magnetic layer comprising ferromagnetic powder and binder on a nonmagnetic support;
   wherein the magnetic layer comprises multiple nonmagnetic particles having a ratio of a major axis length to a minor axis length, major axis length/minor axis length, of less than or equal to 1.5;
   the multiple nonmagnetic particles are present in the magnetic layer in a state where, when a depth to which each of the multiple nonmagnetic particles is embedded in the magnetic layer in observation of a sectional image picked up by a scanning electron microscope is denoted as b and a thickness of the magnetic layer is denoted as t, an average value of a ratio of b/t is less than or equal to 0.9; and
   a number of protrusions greater than or equal to 5 nm in height is greater than or equal to 800 and a number of protrusions greater than or equal to 20 nm in height is less than or equal to 20 as measured by an atomic force microscope per an area 40 μm×40 μm on a magnetic layer side surface of the magnetic recording medium,
   wherein a ratio φ/t of an average major axis length φ of the multiple nonmagnetic particles having a ratio of a major axis length to a minor axis length, major axis length/minor axis length, of less than or equal to 1.5 that are contained in the magnetic layer to the thickness of the magnetic layer is less than or equal to 1.0.

2. The magnetic recording medium according to claim 1, wherein the average major axis length φ of the multiple nonmagnetic particles having a ratio of a major axis length to a minor axis length, major axis length/minor axis length, of less than or equal to 1.5 that are contained in the magnetic layer ranges from 10 nm to 100 nm.

3. The magnetic recording medium according to claim 1, wherein the thickness of the magnetic layer t is less than or equal to 100 nm.

4. The magnetic recording medium according to claim 1, wherein the multiple nonmagnetic particles having a ratio of a major axis length to a minor axis length, major axis length/minor axis length, of less than or equal to 1.5 that are contained in the magnetic layer are inorganic oxide particles.

5. The magnetic recording medium according to claim 4, wherein the inorganic oxide particles are silicon oxide particles.

6. The magnetic recording medium according to claim 5, wherein the silicon oxide particles are silica colloidal particles.

7. The magnetic recording medium according to claim 1, wherein the number of protrusions greater than or equal to 5 nm in height as measured by an atomic force microscope per an area of 40 μm×40 μm on the magnetic layer side surface of the magnetic recording medium is greater than or equal to 800 but less than or equal to 500,000.

8. The magnetic recording medium according to claim 1, wherein the number of protrusions greater than or equal to 5 nm in height as measured by an atomic force microscope per an area of 40 μm×40 μm on the magnetic layer side surface of the magnetic recording medium is greater than or equal to 4,000.

9. The magnetic recording medium according to claim 1, wherein the number of protrusions greater than or equal to 20 nm in height as measured by an atomic force microscope per an area of 40 μm×40 μm on the magnetic layer side surface of the magnetic recording medium is less than or equal to 10.

10. The magnetic recording medium according to claim 1, which comprises a nonmagnetic layer comprising nonmagnetic powder and binder between the nonmagnetic support and the magnetic layer.

\* \* \* \* \*